US012792713B2

(12) United States Patent
Yu et al.

(10) Patent No.: US 12,792,713 B2
(45) Date of Patent: Nov. 10, 2026

(54) TENANTLESS ACCESS ORCHESTRATION ENGINE IN A CLOUD ACCESS MANAGEMENT SYSTEM

(71) Applicant: Microsoft Technology Licensing, LLC, Redmond, WA (US)

(72) Inventors: Yiteng Yu, Shanghai (CN); Qi Yu, Jiangsu (CN); Lingxiao Wei, Jiangsu (CN); Yizhong Wu, Shanghai (CN); Na Li, Bellevue, WA (US); Jie Liu, Bellevue, WA (US); Jun Shi, Redmond, WA (US); Zhicheng Zhang, Shanghai (CN); Xinting Wu, Jiangsu (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/421,804

(22) Filed: Jan. 24, 2024

(65) Prior Publication Data

US 2025/0238493 A1 Jul. 24, 2025

(51) Int. Cl.
*H04L 29/06* (2006.01)
*G06F 21/33* (2013.01)
(Continued)

(52) U.S. Cl.
CPC ............ *G06F 21/33* (2013.01); *G06F 21/575* (2013.01); *G06F 9/45533* (2013.01)

(58) Field of Classification Search
None
See application file for complete search history.

(56) References Cited

U.S. PATENT DOCUMENTS 8,984,610 B2 * 3/2015 Spiers ................. H04L 63/0281 726/22
11,470,075 B2 * 10/2022 Rahn ..................... H04L 69/167
(Continued)

OTHER PUBLICATIONS

Stephanow, Phillip et al. Test-Based Cloud Service Certification of Opportunistic Providers. 2016 IEEE 9th International Conference on Cloud Computing (CLOUD). https://ieeexplore.ieee.org/stamp/stamp.jsp?tp=&arnumber=7820357 (Year: 2016).*
(Continued)

*Primary Examiner* — Jeremiah L Avery
(74) *Attorney, Agent, or Firm* — SHOOK, HARDY & BACON L.L.P.

(57) ABSTRACT

Methods, systems, and computer storage media for providing cloud access management using a tenantless access orchestration engine. Cloud access management supports tenantless access orchestration operations that allow users to use remote client devices in a consumer context. In particular, a remote client device can have an identity to operate on a cloud platform without having a tenant instance associated with the remote client device. In operation, a request is communicated to an identity provider to create identity provider data for a remote client device of a cloud platform. Based on communicating the request, a bootstrap token containing a remote client identifier is received. The remote client device is provisioned based on creating a set of cloud resources for the remote client device and installing the bootstrap token onto a virtual machine associated with the remote client device. The virtual machine is associated with a cloud-provider-managed environment of the cloud platform.

20 Claims, 11 Drawing Sheets

(51) Int. Cl.
*G06F 21/57* (2013.01)
*G06F 9/455* (2018.01)

(56) References Cited

U.S. PATENT DOCUMENTS

| | | | | |
|---|---|---|---|---|
| 11,777,905 | B1 * | 10/2023 | Pabijanskas | G06F 8/61 726/15 |
| 2018/0159845 | A1 * | 6/2018 | Aronov | H04L 63/0435 |
| 2020/0057669 | A1 * | 2/2020 | Hutcheson | G06F 3/0659 |
| 2020/0145404 | A1 * | 5/2020 | Singleton, IV | G06F 9/45558 |
| 2020/0145409 | A1 * | 5/2020 | Pochuev | H04L 63/0853 |
| 2020/0213112 | A1 * | 7/2020 | Singleton, IV | G06F 8/61 |
| 2020/0380109 | A1 * | 12/2020 | Bendersky | G06F 21/33 |
| 2020/0382323 | A1 * | 12/2020 | Keselman | H04L 63/0823 |
| 2022/0014389 | A1 * | 1/2022 | Nix | G06F 21/33 |
| 2022/0100862 | A1 * | 3/2022 | Vetter | G06F 21/33 |
| 2022/0398116 | A1 * | 12/2022 | Chen | G06F 9/45558 |
| 2024/0202725 | A1 * | 6/2024 | Anapliotis | G06Q 30/0607 |

OTHER PUBLICATIONS

Membrey, Peter et al. Trusted Virtual Infrastructure Bootstrapping for On Demand Services. 2012 Seventh International Conference on Availability, Reliability and Security. https://ieeexplore.ieee.org/stamp/stamp.jsp?tp=&arnumber=6329204 (Year: 2012).*

Echeverria, Sebastian et al. Establishing Trusted Identities in Disconnected Edge Environments. 2016 IEEE/ACM Symposium on Edge Computing (SEC). https://ieeexplore.ieee.org/stamp/stamp.jsp?tp=&arnumber=7774673 (Year: 2016).*

International Search Report and Written Opinion received for PCT Application No. PCT/US2024/059264, Mar. 28, 2025, 15 pages.

International Preliminary Report on Patentability (Chapter I) Received for PCT Application No. PCT/US2024/059264, mailed on Aug. 6, 2026, 10 Pages.

* cited by examiner

TENANTLESS ACCESS ORCHESTRATION ENGINE IN A CLOUD ACCESS MANAGEMENT SYSTEM

BACKGROUND

Users rely on computing environments with applications and services to accomplish computing tasks. Distributed computing systems (or cloud computing platforms) host and support different types of applications and services in managed computing environments. In particular, a cloud computing platform can implement a cloud access management system that provides access management functionality for different types of cloud computing offerings. For example, a cloud access management system can support onboarding organizations for different types of cloud computing offerings—including managed desktop services that include virtual machines assigned to individual users as virtual desktop devices configured with productivity, security, and collaboration tools.

SUMMARY

Various aspects of the technology described herein are generally directed to systems, methods, and computer storage media for, among other things, providing cloud access management using a tenantless access orchestration engine. Cloud access management supports access orchestration operations that allow users to use remote client devices (or remote clients) in a consumer context. In particular, a remote client device can have a remote client device identity to operate on a cloud platform without having a tenant associated with the remote client device.

The tenantless access orchestration engine operates based on a tenantless access orchestration workflow designed for identities of remote client devices for consumers. By way of illustration, the tenantless access orchestration workflow includes access orchestration operations that support a Desktop as a Service (DaaS) scenario, where a cloud platform hosts cloud resources in a cloud-provider-managed environment (aka hosted on behalf of "HOBO"). The cloud platform can register remote client devices without the remote client devices being associated with tenant information. The cloud platform provisions remote client devices with cloud resources, the cloud resources are associated with the cloud-provider-managed environment. The cloud platform also installs, on the remote client devices, bootstrap tokens as a temporary identities, via a secure channel of the cloud-provider-managed environment. The tenantless access orchestration workflow simplifies a join process for a remote client device and provides flexibility to assign the remote client device to either a tenant or consumer users after a remote client device join.

Conventionally, cloud access management systems are not configured with comprehensive computing logic and infrastructure to effectively support joining a consumer user remote client device—without tenant information—to a cloud platform. In some examples, a cloud-powered productivity platform or cloud computing platform ("cloud platform") can be designed to provide productivity applications. For example, cloud-powered tools and services can be offered by MICROSOFT 365. The cloud platform and productivity applications can be implemented via PCs, Macs, tablets, and phones. The cloud platform can provide applications and services designed to help individuals, businesses, and organizations collaborate, communicate, and accomplish tasks more efficiently.

The cloud platform, as initially designed, supports business use cases "business context" (e.g., small businesses and organizations). As such, the existing architecture lacks adaptability and tailored functionality for consumer use cases "consumer context". In particular, while the existing architecture meets the specific needs and requirements for onboarding users in the business context, onboarding for a consumer context demands different features, capabilities, and user interactions. The initial architecture of the cloud platform does not align with the unique demands and expectations of the expanded context, leading to potential inefficiencies, usability issues, and mismatch between the business context requirements and the consumer context requirements. As such, adaptation and customization is necessary to ensure improved performance (e.g., operations and interfaces) for computing functionality and user satisfaction in the diverse settings of the expanded use.

A technical solution—to the limitations of conventional cloud access management systems—can include providing tenantless access orchestration operations and interfaces via a tenantless access orchestration engine that supports cloud access management in a cloud access management system. Tenantless access orchestration operations can include managing remote client devices that are not associated with a tenant. In the business context, remote client devices are associated with tenants; however, in the consumer context, remote client devices are not associated with a tenant. In particular, for the consumer context, no tenant information is available for a consumer identity and a remote client device to join a cloud platform. The cloud platform can operate with a cloud-based identity provider or access management service (e.g., MICROSOFT ENTRA ID or AZURE ACTIVE DIRECTORY) but not require tenant information (e.g., a tenant instance)—that corresponds to a remote client device—in order to join an identity to the remote client device. In this way, the tenantless access orchestration engine supports a tenantless access orchestration workflow to manage remote client device identities for consumers. In this way, the cloud platform can support a DaaS scenario and a tenantless access orchestration engine that supports remote client device identities for consumers that are not associated with tenants, while maintaining the same level of security.

In operation, in a first embodiment, a request is communicated from a cloud-based services engine to an identity provider to create identity provider data for a remote client device of a cloud platform. Based on communicating the request, a bootstrap token containing a new remote client device identifier is received. The remote client device is provisioned, where provisioning the remote client device includes creating a set of cloud resources and installing the bootstrap token onto a virtual machine associated with the remote client device. The virtual machine is associated with a cloud-provider-managed environment and a secure channel of the cloud-provider-managed environment that supports installing the bootstrap token on the virtual machine. The remote client device is configured to employ the bootstrap token to request a signed certificate from the identity provider, where the signed certificate supports the remote client device access to applications and services of the cloud platform.

In a second embodiment, a first request to create identity provider for a remote client device of a cloud platform is received from a cloud-based services engine. The identity provider data comprising a bootstrap token is generated. The bootstrap token contains a new remote client device identifier. The bootstrap token containing the new remote client device identifier is communicated. A second request, from the remote client device, for a signed certificate, is received. The signed certificate is communicated to the remote client device, for the remote client device to access applications and services of the cloud platform.

In a third embodiment, a request for a signed certificate is communicated from a remote client device. The signed certificate is associated with identity provider data for the remote client device. The signed certificate is received from the identity provider, the signed certificate is associated with the identity provider data. An application or service of the cloud platform is accessed at the remote client device based on the signed certificate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE TECHNICAL SOLUTION

Overview

Figure 1A:
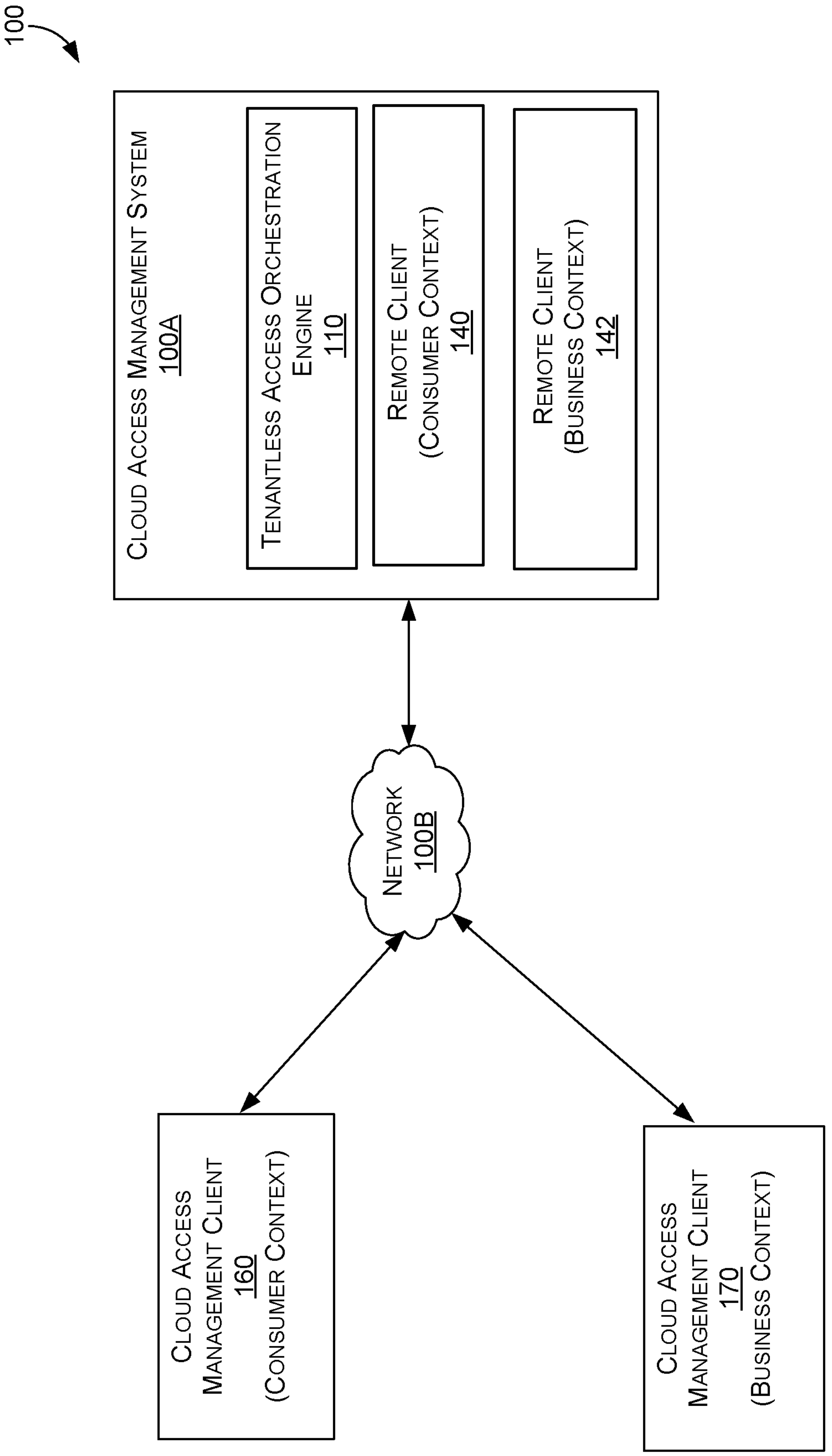
FIGS. 1A and 1B are block diagrams of an exemplary cloud access management system including a tenantless access orchestration engine, in accordance with aspects of the technology described herein.

A cloud access management system supports identities and access management in the cloud. The cloud access management system can give both onsite and remote employees seamless access to their organization's resources, enable secure and seamless access to applications, and protect and govern access. For example, the cloud access management system can efficiently manage identities by ensuring the right people have the right access to the right resources. The cloud access management system can further support access to different types of cloud offerings. For example, a cloud access management system can support onboarding organizations for different types of cloud computing offerings—including managed desktop services that include virtual machines assigned to individual users as virtual desktop devices configured with productivity, security, and collaboration tools.

Conventionally, cloud access management systems are not configured with comprehensive computing logic and infrastructure to effectively support joining a consumer user remote client device—without tenant information—to a cloud platform. A cloud platform can be originally designed to cater to the needs of businesses, specifically small businesses and organizations. However, the design of the platform is not suited for consumer use cases. In this way, cloud access management can be suitable for a "business context"—original intended users and their requirements, while not suitable for "consumer context"—a broader audience, including individual consumers, with different needs and expectations. The existing architecture of the cloud platform is tailored to support the onboarding of users in a business context, optimized for the specific needs and requirements of businesses. However, when it comes to onboarding users in a consumer context, there are different demands in terms of features, capabilities, and user interactions. The current architecture does not align with the unique demands of consumers, leading to potential inefficiencies and usability issues. As such, a more comprehensive cloud access management system—with an alternative basis for performing cloud access management operations—can improve computing operations and interfaces in cloud access management systems.

Embodiments of the present technical solution are directed to systems, methods, and computer storage media for, among other things, providing cloud access management using a tenantless access orchestration engine. Cloud access management supports access orchestration operations that allow users to use remote client devices (or remote clients) in a consumer context. In particular, a remote client device can have a remote client device identity to operate on a cloud platform without having a tenant (e.g., tenant information) associated with the remote client device. Cloud access management is provided using the tenantless access orchestration engine that is operationally integrated into the cloud access management system.

The tenantless access orchestration engine operates based on a tenantless access orchestration workflow designed for identities of remote client devices for consumers. By way of illustration, the tenantless access orchestration workflow includes access orchestration operations that support a Desktop as a Service (DaaS) scenario, where a cloud platform hosts cloud resources in a cloud-provider-managed environment (aka hosted on behalf of "HOBO"). The cloud platform can register remote client devices without the remote client devices being associated with tenant information. The cloud platform provisions remote client devices with cloud resources associated with the cloud-provider-managed environment and installs bootstrap tokens—as temporary identities—via a secure channel of the cloud-provider-managed environment. The tenantless access orchestration workflow simplifies a join process for the remote client devices and provides flexibility to assign the remote client devices to either a tenant or consumer users after a remote client device join.

At a high level, the cloud access management system supports access orchestration operations that allow users to use remote client devices (or remote clients) in a consumer context. By way of context, a consumer identity may be an account or profile having credentials (e.g., username and password, time-based one time password, number-matching, notification, biometric, multi-factor authentication) that are used to provide access to computing resources. It is contemplated that the consumer identity can be associated with different types of authentication mechanisms that support verifying the identity of users to ensure only authorized users gain access to protected resources. The consumer identity can be assigned an account or profile of a cloud computing provider platform that supports different cloud computing offerings.

The consumer identity can be associated with one or more identity providers (e.g., external identity provider and/or internal identity provider) for authentication and may be associated with an email service. The consumer identity may be an existing consumer identity or may be created in real-time. The consumer identity can be associated with consumer identity resources (e.g., personal user resources, cloud storage, email, applications and services) that are accessible via a computing environment (e.g., remote client workspace or virtual machine workspace). In one example, a user can use their consumer identity (e.g., OUTLOOK, GMAIL, HOTMAIL, or phone number) to sign up for an account (e.g., MICROSOFT account) associated with the cloud computing provider. The account can be passwordless (e.g., uses a multi-factor authentication). The consumer identity associated with the account can be used to access the remote client associated with a tenantless consumer or a tenant of an organization. An organization may be a customer of a cloud computing platform. The consumer or organization can be provided cloud computing platform services including access, management, and development of applications and services.

A tenantless access orchestration engine can include three main components: a cloud-based services engine, a remote client device, and an identity provider. The cloud-based services engine is a management service that provides business resources and logic. For example, the cloud-based services engine provisions remote client devices, monitors remote client devices, and enables users to restart and restore remote client devices. A remote client device is a cloud-hosted virtual desktop or DaaS. The remote client device is a virtualized desktop environment hosted in the cloud platform rather than on a local physical computer or on-premises. The remote client device can specifically be a HOBO (i.e., cloud-provider-managed environment) remote client device that is supported by the cloud platform provider. For example, a subscription associated with the remote client device is owned and controlled by the cloud platform provider. The identity provider is built to provide identity support, including maintaining device identities, issuing tokens, and device certificates, and providing metadata for token validation and cert validation.

Figure 1B:
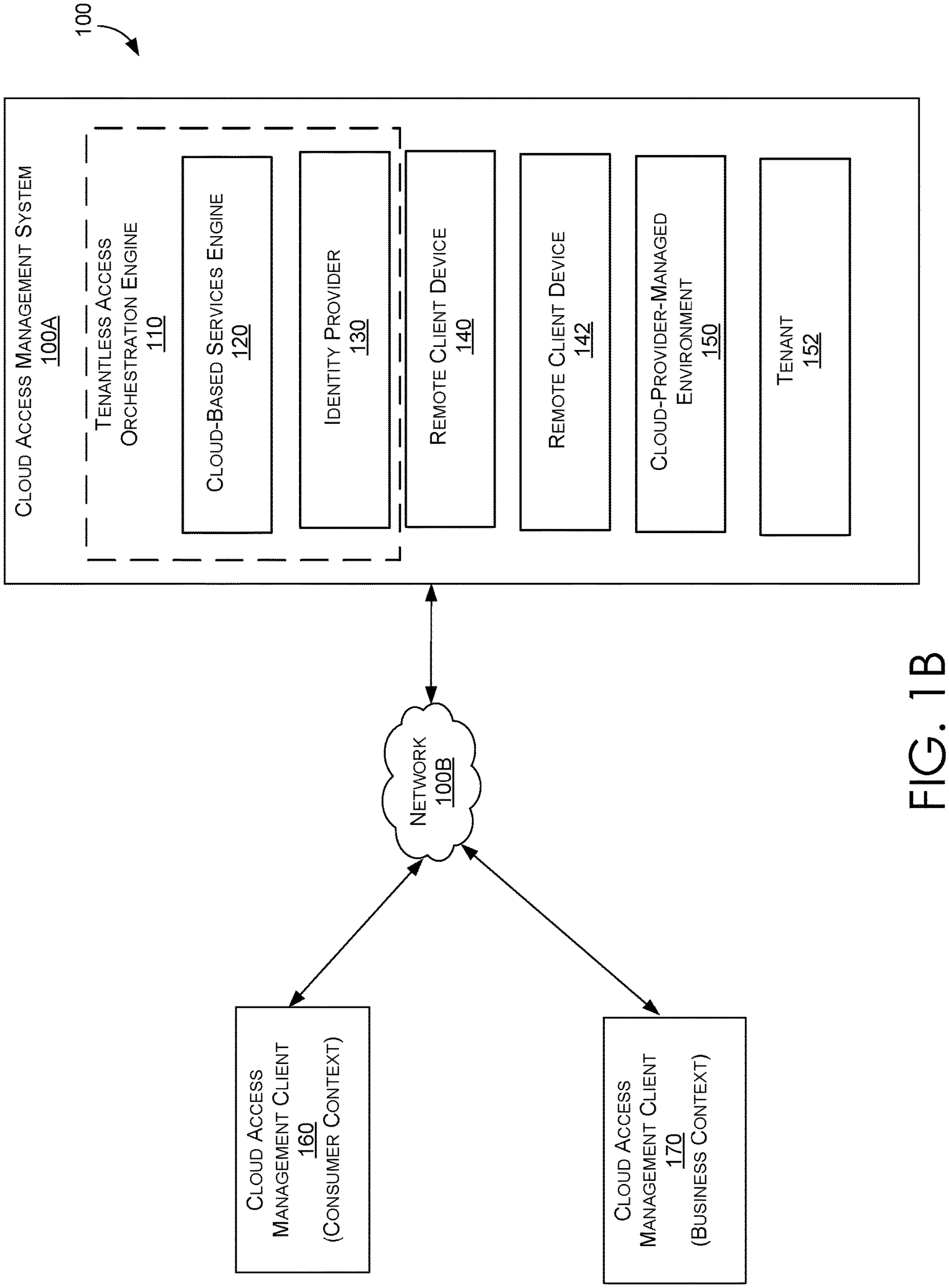
Figure 1C:
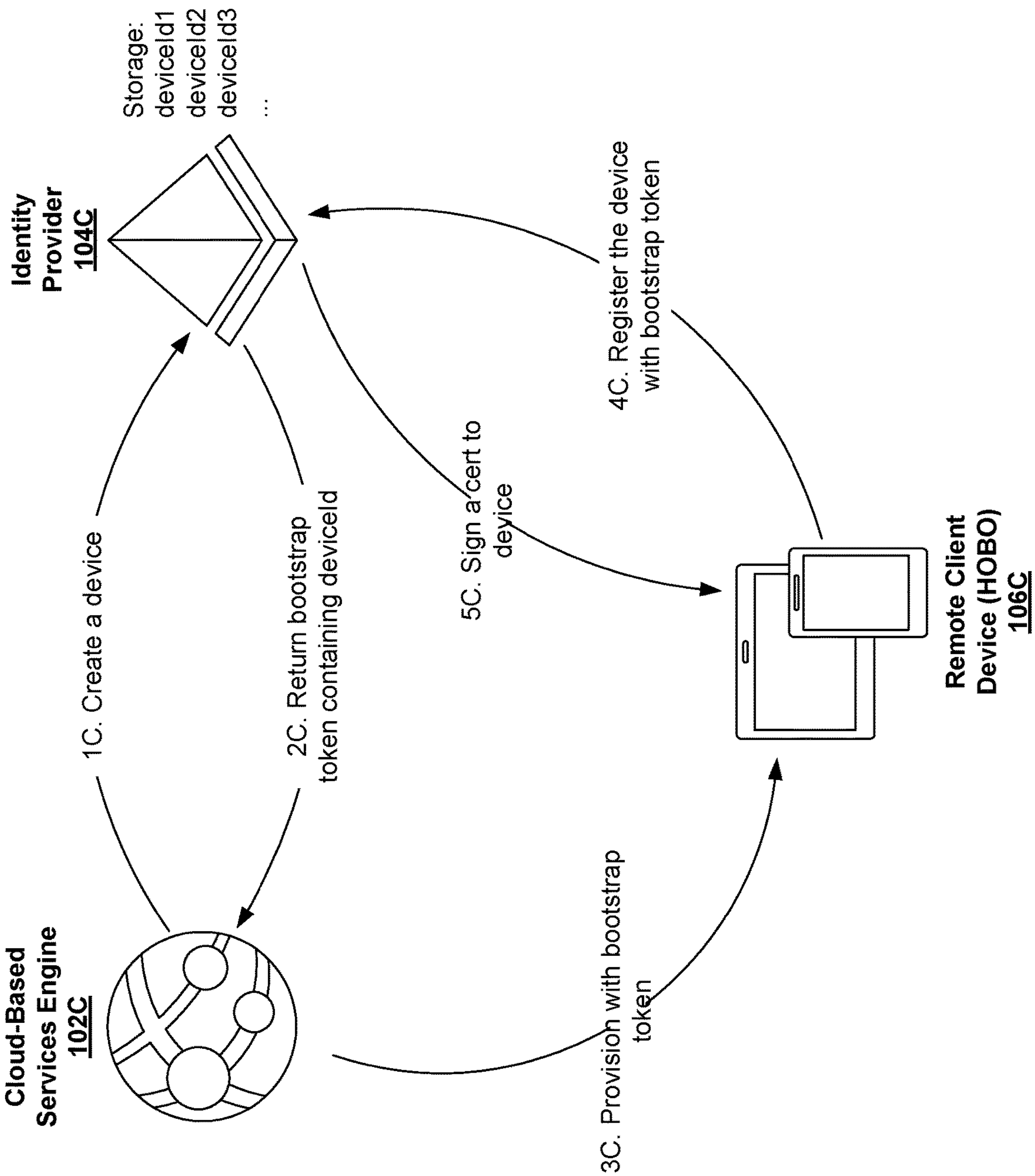
FIGS. 1C and 1D are schematics associated with an exemplary cloud access management system including a tenantless access orchestration engine, in accordance with aspects of the technology described herein.

With reference to FIG. 1C, FIG. 1C illustrates an example flow for joining a remote client device with a tenantless identity system (i.e., tenantless access orchestration engine). FIG. 1C, illustrates cloud-based services engine 102C, identity provider 104C, and remote client device 106C. The remote client device 106C can be on-boarded onto a cloud computing platform via the tenantless access orchestration engine. The on-boarding process can be in three stages: (1) a remote client device pre-creation stage; (2) a remote client device provisioning stage; and (3) a certificate signing stage.

In the remote client device pre-creation stage, the cloud-based services engine 102C, at step 1C, creates a remote client device 106C in the identity provider 104C, and at step 2C, the identity provider 104C returns a bootstrap token containing a remote client device identifier (e.g., a new remote client device identifier). The identity provider 104C stores the remote client device identity 104C including a join status and assignment status for the remote client device 106C.

At the remote client device provisioning stage, the cloud-based services engine 102C, at step 3C, provisions the remote client device 106C by creating a set of cloud resources. The cloud-based services engine 102C also installs a bootstrap token onto a virtual machine associated with the remote client device 106C. As noted, the cloud resources are associated with a cloud-provider-managed environment (e.g., subscription) that is owned and controlled by the cloud platform provider. The cloud-provider-managed environment can leverage a trusted or secure channel in the cloud-provider-managed environment to securely install the bootstrap token to a specific virtual machine.

At the certificate signing stage, the remote client device 106C, at step 4C, uses the bootstrap token to request a certificate, and the identity provider 104C, at step 5C, signs a certificate and updates a remote client device identity join status and a remote client device assignment status after validating the token. After the remote client device 106C has been joined to the cloud platform via the cloud-provider-managed environment, the remote client device 106C can use the signed certificate as an identity to communicate with applications and services on the cloud platform. It is contemplated that the identity provider 104C can assign the remote client device 106C to a tenant user or a consumer user.

Onboarding the remote client device using the tenantless access orchestration workflow can provide improvements over a tenant-based access orchestration workflow. With tenant-based access orchestration, a remote client device identity is meaningless without a corresponding tenant account as an owner. The tenant account information is required for the identity provider to join the remote client device. However, in the DaaS scenario, the cloud-provider-managed environment manages cloud-provider-managed environment cloud resources on behalf of users, allowing the cloud-provider-managed environment to register remote client devices without tenant information. In this way, the tenantless access orchestration workflow simplifies the remote client device join process and provides flexibility to assign the remote client device to either tenant or consumer users after device join.

By way of illustration, IoT devices on public networks typically require user credentials as a first identity to securely trigger remote client device join. In the DaaS scenario, the cloud platform provisions remote client devices using a cloud-provider-managed environment with cloud resources and installs a bootstrap token as a temporary identity with a secure channel in the cloud-provider-managed environment. This allows the remote client devices to initiate remote client join without requiring user credentials.

Figure 1D:
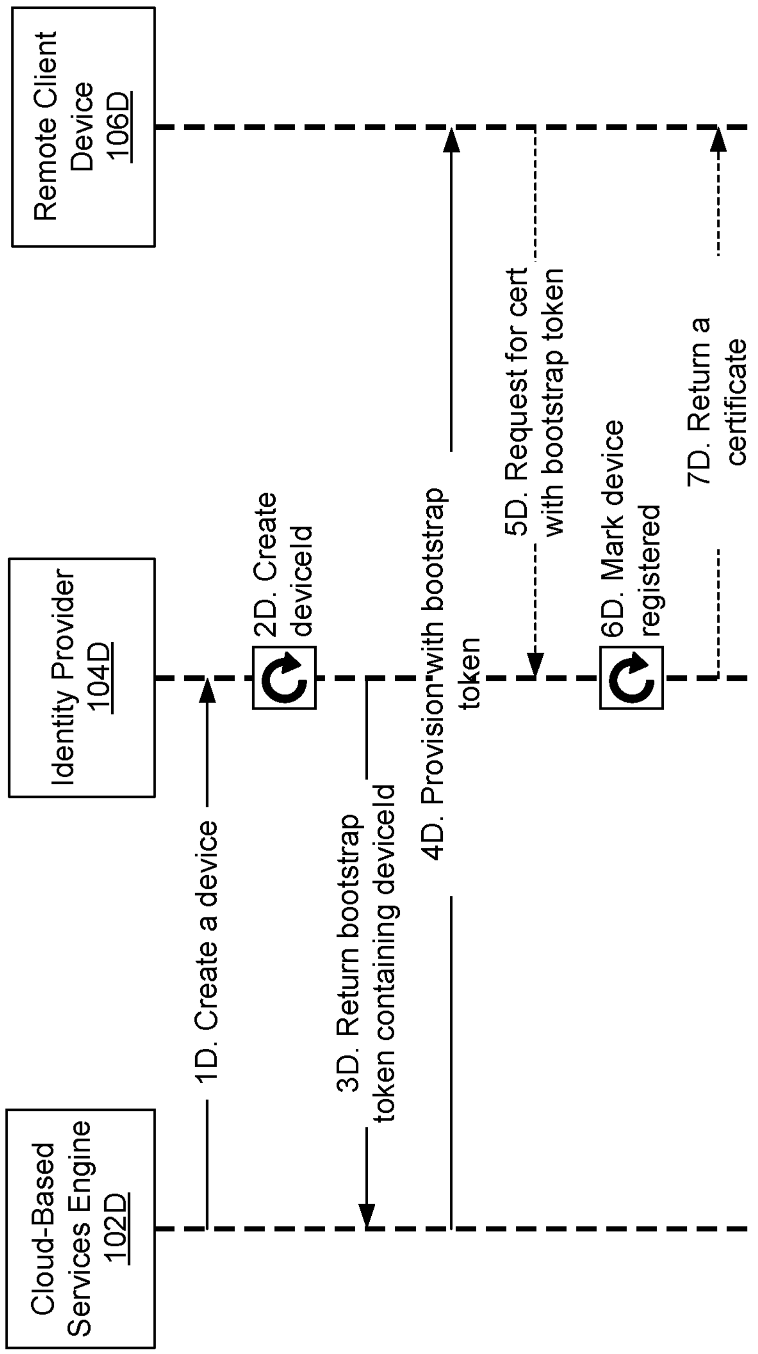

With reference to FIG. 1D, FIG. 1D illustrates example steps for assigning an identity to a remote client device using a tenantless access orchestration engine associated with cloud-based services engine 102D, identity provider 104D, and remote client device 106D. At step 1D, the cloud-based services engine 102D communicates a request to create a new remote client device. At step 2D, the identity provider

104D receives the request, and based on the request generates a remote client device identifier for a remote client device 106D. At step 3D, the identity provider 104D issues a bootstrap token which contains the remote client device identifier and returns the token to the cloud-based services engine. At step 4D, the cloud-based services engine 102D provisions the remote client device 106D by creating a set of cloud resources and installing an agent in a virtual machine with the bootstrap token. At step 5D, the remote client device 106D generates a certificate signing request (CSR) which contains the remote client device identifier and sends the CSR to the identity provider 104D with the bootstrap token. At step 6D, the identity provider validates the bootstrap token and related remote client device identifier, and then issues a certificate which contains the remote client device identifier and marks the device as registered. At step 7D, the identity provider returns the certificate to the remote client device 106D, and the remote client device 106D installs the certificate.

Aspects of the technical solution can be described by way of examples and with reference to FIGS. 1A-1B. FIG. 1A illustrates a cloud computing environment (system) 100 and cloud access management system 100A. The cloud access management system 100A includes network 110B, tenantless access orchestration engine 110, remote client 140, remote client 142, cloud access management client 160 and client access management client 170.

The cloud computing environment 100 provides computing system resources for different types of managed computing environments. For example, the cloud computing platform supports delivery of computing services—including compute, servers, storage, databases, networking, and intelligence. A plurality of cloud access management clients (e.g., cloud access management client 160 and cloud access management client 170) include hardware or software that access resources in the cloud computing environment 100. Cloud access management client 160 and cloud access management client 170 can each include an application that supports client-side functionality associated with cloud computing environment. For example, cloud access management client 160 may represent a consumer client associated with remote client 140 in a consumer context; and cloud management client 170 associated with remote client 142 in a business context. The plurality of cloud access management clients can access computing components of the cloud computing environment 100 via a network (e.g., network 100B) to perform computing operations.

The cloud access management system 100A is designed to provide access management using the tenantless access orchestration engine 110. The cloud access management system 100A provides an integrated operating environment based on a tenantless access orchestration framework of computing components associated with providing tenantless access to a cloud platform for remote client devices. In particular, the tenantless access orchestration engine 110 is includes tenantless access orchestration operations that support a consumer user to access a remote client (e.g., remote client 140) in a consumer context (i.e., without tenant information) and an organization user to access a remote client (e.g., remote client 142) in a business context (i.e., with tenant information).

With reference to FIG. 1B, FIG. 1B illustrates cloud access management system 100A, tenantless access orchestration engine 110 including cloud-based services engine 120, identity provider 130, remote client 140, remote client 142, cloud-provider-managed environment 150, tenant 152, cloud access management client 160, and client access management client 170.

Tenantless access orchestration engine 110 is includes cloud-based services engine 120, identity provider 130, and remote client 140 (or remote client 142). The cloud-based services engine 120 is a management service that provides business resources and logic. For example, the cloud-based services engine 120 provisions remote client devices (e.g., remote client 140 or remote client 142), monitors remote client devices, and enables users to restart and restore remote client devices (e.g., via cloud access management client 160 or cloud access management client 170).

The remote client device 140 is a cloud-hosted virtual desktop or DaaS. The remote client device 140 is a virtualized desktop environment hosted in the cloud platform rather than on a local physical computer or on-premises. The remote client device 140 can specifically be a HOBO (e.g., cloud-provider-managed environment 150) remote client device that is supported by the cloud platform provider. For example, the cloud-provider-managed environment 150 can be a subscription associated with the remote client device owned and controlled by the cloud platform provider. A remote device (e.g., remote client device 150) can be supported by a tenant (e.g., tenant 152) that is a reserved cloud computing infrastructure instance that an organization receives, owns, controls, once it signs up for cloud computing services via a cloud platform. The identity provider 130 is built to provide identity support, including maintaining device identities, issuing tokens, and device certificates, and providing metadata for token validation and cert validation.

The remote client device 140 can be on-boarded onto a cloud computing platform via the tenantless access orchestration engine 110. The on-boarding process can be in three stages: (1) a remote client device pre-creation stage; (2) a remote client device provisioning stage; and (3) a certificate signing stage. In the remote client device pre-creation stage, the cloud-based services engine 110 creates remote client device 140 in the identity provider 130, and the identity provider 120 returns a bootstrap token containing a remote client device identifier. The identity provider 130 stores the identity provider data including a join status and assignment status for the remote client device 140.

At the remote client device provisioning stage, the cloud-based services engine 120 provisions the remote client device 140 by creating a set of cloud resources. The cloud-based services engine 120 also installs a bootstrap token onto a virtual machine associated with the remote client device 140. As noted, the cloud resources are associated with a cloud-provider-managed environment 150 that is owned and controlled by the cloud platform provider. The cloud-provider-managed environment 150 can leverage a trusted or secure channel (not shown) in the cloud-provider-managed environment 150 to securely install the bootstrap token to a specific virtual machine.

At the certificate signing stage, the remote client device 140 uses the bootstrap token to request a certificate, and the identity provider 130 signs a certificate and updates the remote client device identity join status and assignment status after validating the token. After the remote client device 140 has been joined to the cloud platform—via the cloud-provider-managed environment 150—the remote client device 150 can use the signed certificate as an identity to communicate with applications and services on the cloud platform. It is contemplated that the identity provider 130 can assign the remote client device 142 to a tenant user (e.g., tenant 152).

Figure 2A:
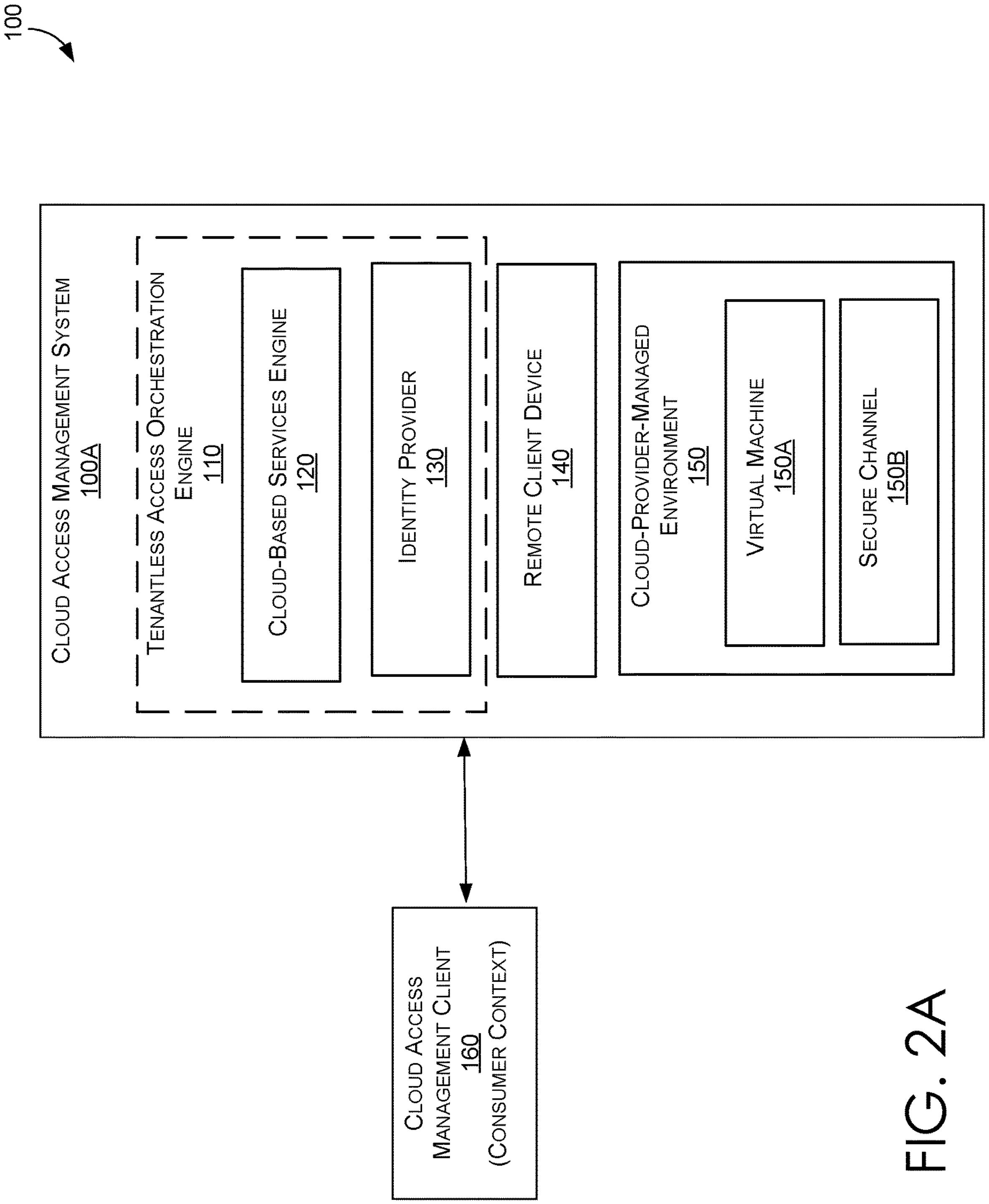
FIGS. 2A and 2B are block diagrams of an exemplary cloud access management system including a tenantless access orchestration engine, in accordance with aspects of the technology described herein.
Figure 2B:
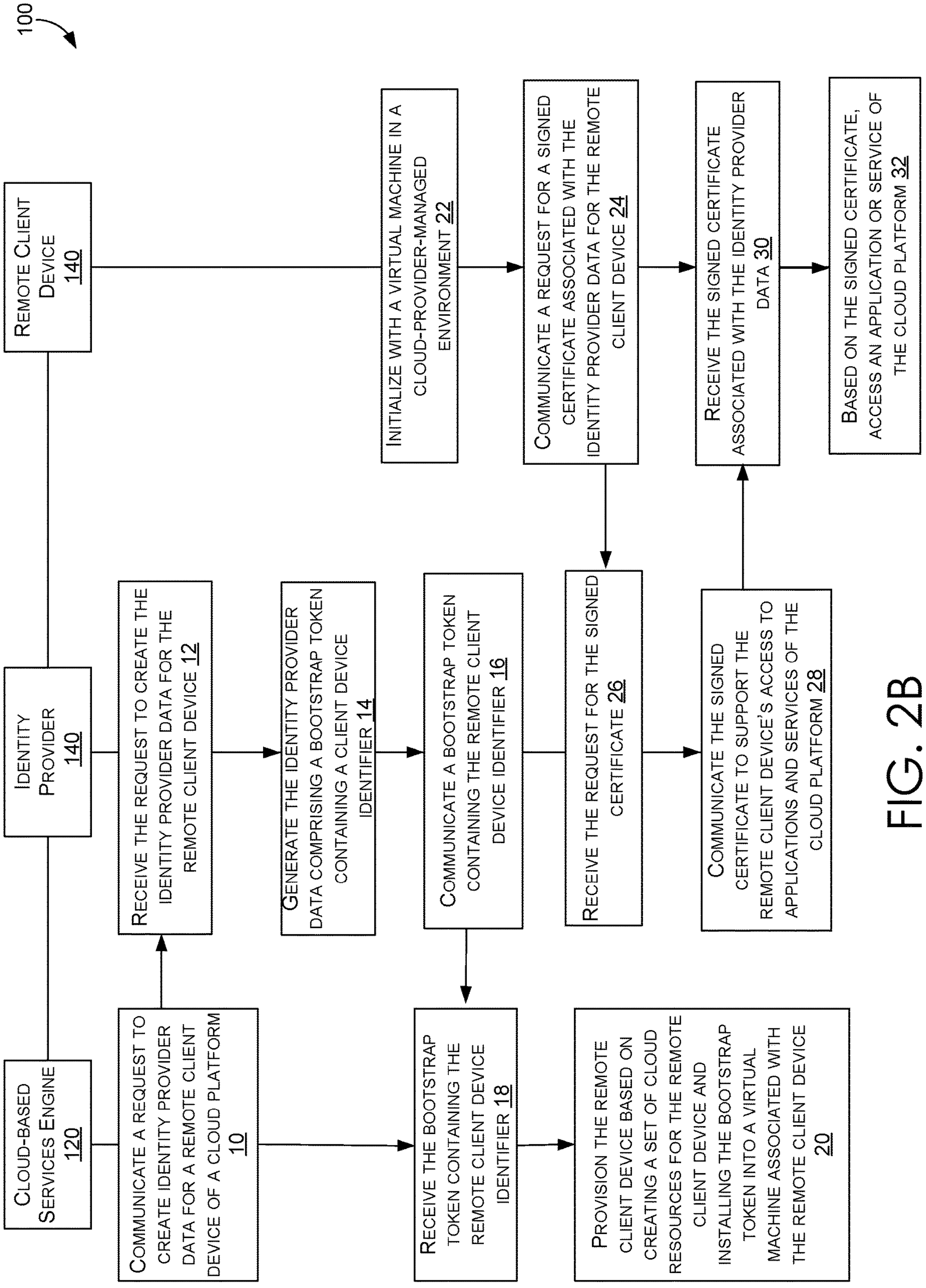

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example cloud access management system 100A in which methods of the present disclosure may be employed. In particular, FIG. 2A shows a high level architecture of the cloud access management system 100A in accordance with implementations of the present disclosure. Among other engines, managers, generators, selectors, or components not shown (collectively referred to herein as "components"), the technical solution environment of cloud access management system 100A corresponds to FIGS. 1A and 1B.

With reference to FIG. 2A, FIG. 2A illustrates a cloud access management system 100A having a tenantless access orchestration engine 110 having cloud-based services engine 120, identity provider 130, remote client 140, cloud-provider-managed environment 150 including virtual machine 150A and secure channel 150B, and cloud access management client 160.

The tenantless access orchestration engine 110 includes access orchestration operations that allow users to use remote client devices (e.g., remote client 140) in a consumer context, without needing tenant information. The cloud-based services engine 120 communicates a request to identity provider 130 to create identity provider data for a remote client device of a cloud platform. Based on communicating the request, the cloud-based services engine 120 receives a bootstrap token containing a remote client device identifier that is generated and communicated from the identity provider 130.

The cloud-based services engine 120 provisions the remote client device 140. Provisioning the remote client device 140 includes creating a set of cloud resources for the remote client device 140 and installing the bootstrap token onto a virtual machine 150A associated with the remote client device 140. The remote client device 140 is configured to employ the bootstrap token to request a signed certificate from the identity provider 130, the signed certificate supports the remote client device 140 to access applications and services of the cloud platform.

The virtual machine 150A is associated with the cloud-provider-managed environment 150. The cloud-provider-managed environment 150 includes a secure channel 150B that supports installing the bootstrap token on the virtual machine 150A of the cloud-provider-managed environment 150. The bootstrap token can be a temporary identity that is operable with the remote client device 140 in a consumer context associated with the cloud-provider-managed environment 150. Tenantless access orchestration engine 140 provides tenantless access orchestration operations to allow users to use remote client devices in a consumer context when the remote client devices are not associated with tenant information. The tenantless access orchestration operations support a DaaS feature of the cloud platform that hosts cloud resources in the cloud-provider-managed environment 150.

The remote client device 140 is communicates a request for a signed certificate from the identity provider 130. The signed certificate is generated based on identity provider data for the remote client device 140. The remote client device 140 receives the signed certificate associated with the identity provider data. Based on the signed certificate, the remote client device 140 accesses an application or service of the cloud platform.

The identity provider 130 is receives a first request, from the cloud-based services engine 120 to create identity provider data for the remote client device 140. The identity provider 130 communicates a bootstrap token containing a remote client device identifier. The identity provider 130 receives a second request, from the remote client 140, for a signed certificate, and communicates the signed certificate to the remote client device 140. The signed certificate supports the remote client device's access to applications and services of the cloud platform. The identity provider 130 stores the identity provider data including a join status and assignment status of remote client devices.

With reference to FIG. 2B, FIG. 2B illustrates a cloud-based services engine 120, identity provider 130, and remote client device 140 in accordance with embodiments of the present technical solution. At block 10, the cloud-based services engine 120 communicates a request to create identity provider data for a remote client device of a cloud platform. At block 12, the identity provider receives the request to create the identity provider data for the remote client device. At block 14, the identity provider 140 generates the identity provider data comprising a bootstrap token containing a client device identifier; and at block 16, communicates a bootstrap token containing the remote client device identifier. At block 18, the cloud-based services engine receives the bootstrap token containing the remote client device identifier; and at block 20, provisions the remote client device based on creating a set of cloud resources for the remote client device and installing the bootstrap token onto a virtual machine associated with the remote client device.

At block 22, the remote client 14 is initialized with a virtual machine in a cloud-provider-managed environment; and at block 24, the remote client device 140 communicates a request for a signed certificate associated with identity provider data for the remote client device. At block 26, the identity provider 140, receives the request for the signed certificate; and block 28, the identity provider 140, communicates the signed certificate to support the remote client device's access to applications and services of the cloud platform. At block 30, the remote client device receives the signed certificate associated with the identity provider data; and at block 32, based on the signed certificate, the remote client device 140 accesses an application or service of the cloud platform.

Example Methods

Figure 3:
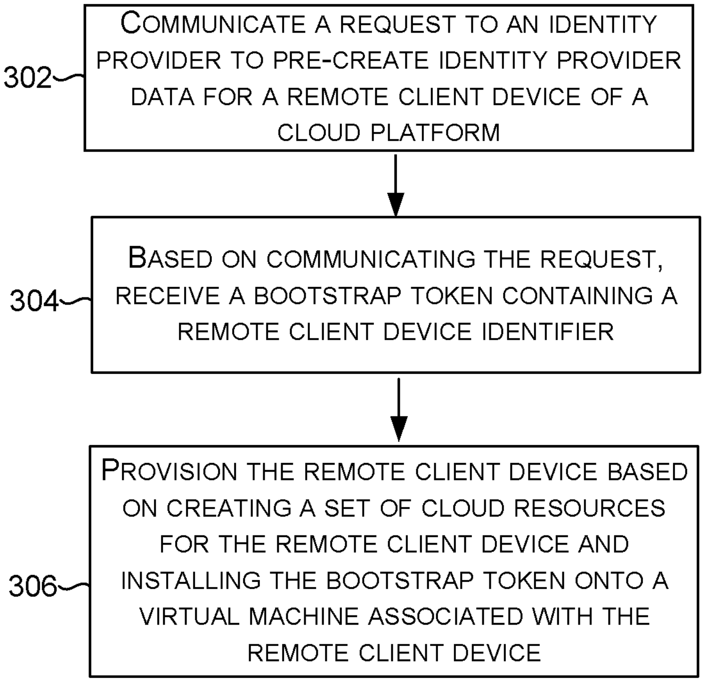
FIG. 3 provides a first exemplary method of providing cloud access management using a tenantless access orchestration engine, in accordance with aspects of the technology described herein.
Figure 4:
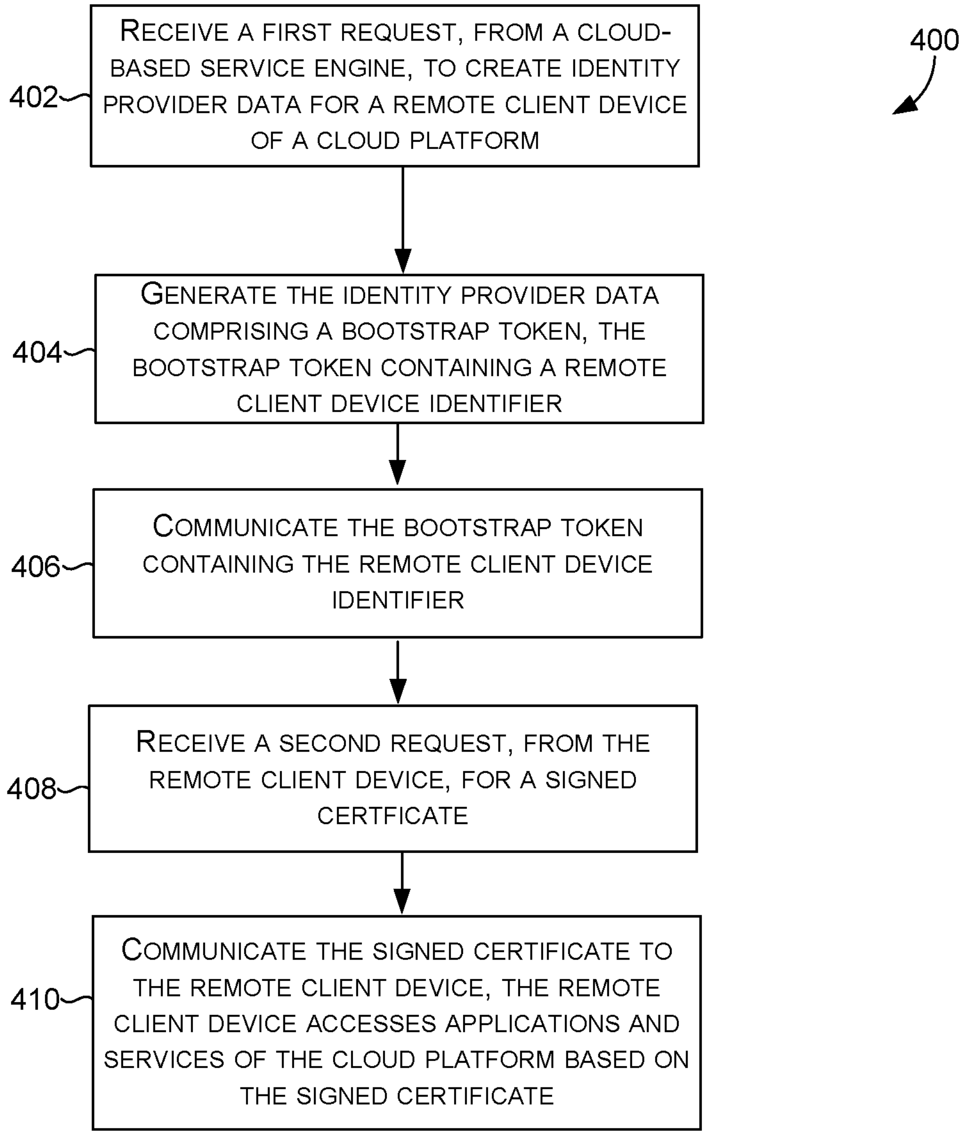
FIG. 4 provides a second exemplary method of providing cloud access management using a tenantless access orchestration engine, in accordance with aspects of the technology described herein.
Figure 5:
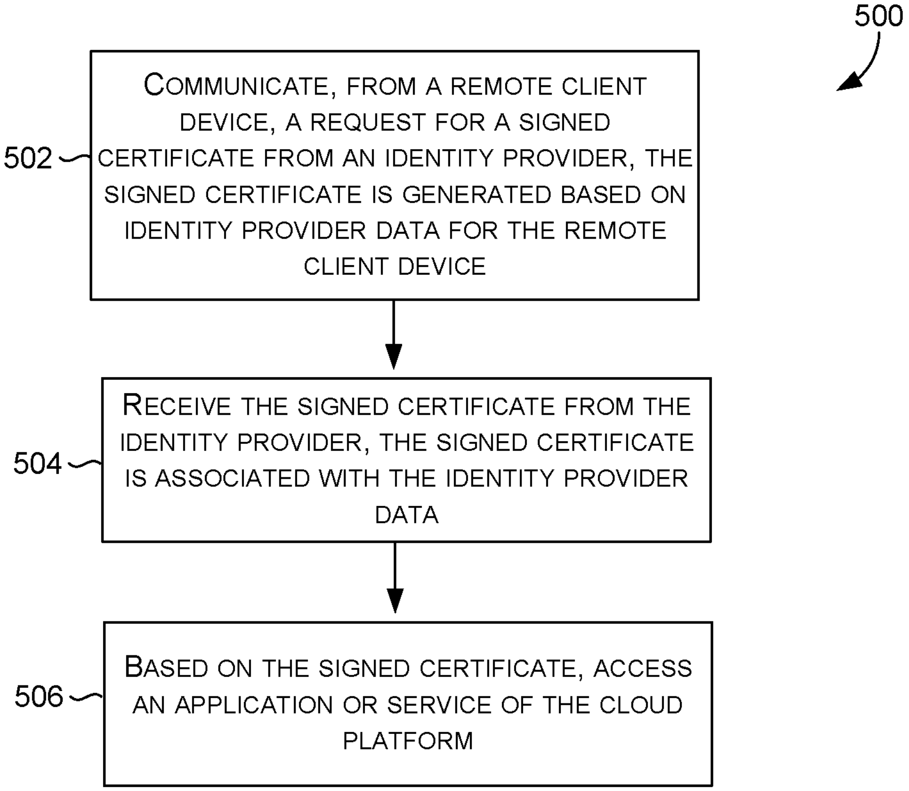
FIG. 5 provides a third exemplary method of providing cloud access management using a tenantless access orchestration engine, in accordance with aspects of the technology described herein.

With reference to FIGS. 3, 4, and 5, flow diagrams are provided illustrating methods for providing cloud access management using a tenantless access orchestration engine. The methods may be performed using the cloud access management system described herein. In embodiments, one or more computer storage media having computer-executable or computer-useable instructions embodied thereon that, when executed, by one or more processors can cause the one or more processors to perform the methods (e.g., computer-implemented method) in the cloud access management system (e.g., a computerized system or computing system).

Turning to FIG. 3, a flow diagram is provided that illustrates a method 300 for providing cloud access management using a tenantless access orchestration engine in a cloud access management system. At block 302, communicate a request to an identity provider to create identity provider data for a remote client device of a cloud platform.

At block 304, based on communicating the request, receive a bootstrap token containing new remote client device identifier. At block 306, provision the remote client device based on creating a set of cloud resources for the remote client device and installing the bootstrap token onto a virtual machine associated with the remote client device.

Turning to FIG. 4, a flow diagram is provided that illustrates a method 400 for providing cloud access management using a tenantless access orchestration engine in a cloud access management system. At block 402, receive a first request, from a cloud-based services engine, to create identity provider data for a remote client device of a cloud platform. At block 404, generate the identity provider data comprising a bootstrap token, the bootstrap token containing a new remote device identifier. At block 404, generate the identity provider data comprising a bootstrap token, the bootstrap token containing a remote client device identifier. At block 406, communicate the bootstrap token containing the new remote client device identifier. At block 408, receive a second request, from the remote client, for a signed certificate. At block 4010, communicate the signed certificate to the remote client device. The remote client device accesses applications and services of the cloud platform based on the signed certificate.

Turning to FIG. 5, a flow diagram is provided that illustrates a method 500 for providing cloud access management using a tenantless access orchestration engine in a cloud access management system. At block 502, communicate, from a remote client device, a request for a signed certificate from an identity provider, the signed certificate is generated based on identity provider data for the remote client device. At block 504, receive, from the identity provider, the signed certificate associated with the identity provider data. At block 506, based on the signed certificate, access an application or service of the cloud platform.

Technical Improvement

Advantageously, the embodiments of the present technical solution include several inventive features (e.g., operations, systems, engines, and components) associated with a cloud access management system having the tenantless access orchestration engine. Inventive features are described with reference to operations for providing consumer-identity-based access to remote client using a tenantless access orchestration engine in a cloud access management system. Functionality of the embodiments of the present technical solution have been described, by way of an implementation and anecdotal examples, to demonstrate that the tenantless access orchestration operations are a solution to a specific problem in cloud access management to improve computing operations and interfaces for cloud access management systems. For example, in the DaaS scenario, the cloud-provider-managed environment manages cloud-provider-managed environment cloud resources on behalf of users, allowing the cloud-provider-managed environment to register remote client devices without tenant information. In this way, the tenantless access orchestration workflow simplifies the remote client device join process and provides flexibility to assign the remote client device to either tenant users or consumer users after device join.

Additional Support for Detailed Description

Example Distributed Computing System Environment

Figure 6:
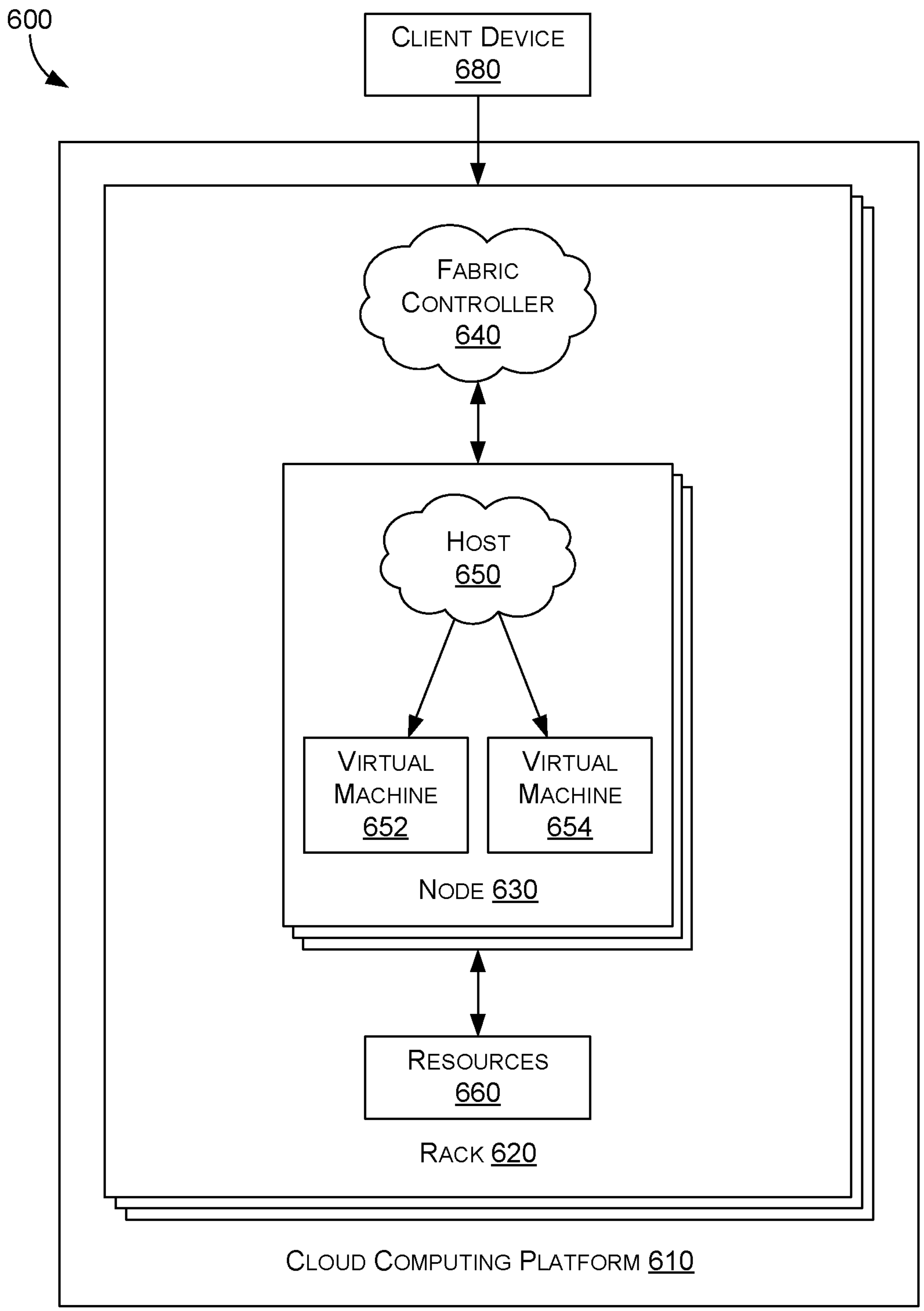
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant may be a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present technical solution, an example operating environment in which embodiments of the present technical solution may be implemented is described below in order to provide a general context for various aspects of the present technical solution. Referring initially to FIG. 6 in particular, an example operating environment for implementing embodiments of the present technical solution is shown and designated generally as computing device 600. Computing device 600 is but one example of a suitable computing environment and is not intended to suggest any limitation as to the scope of use or functionality of the technical solution. Neither should computing device 700 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

Figure 7:
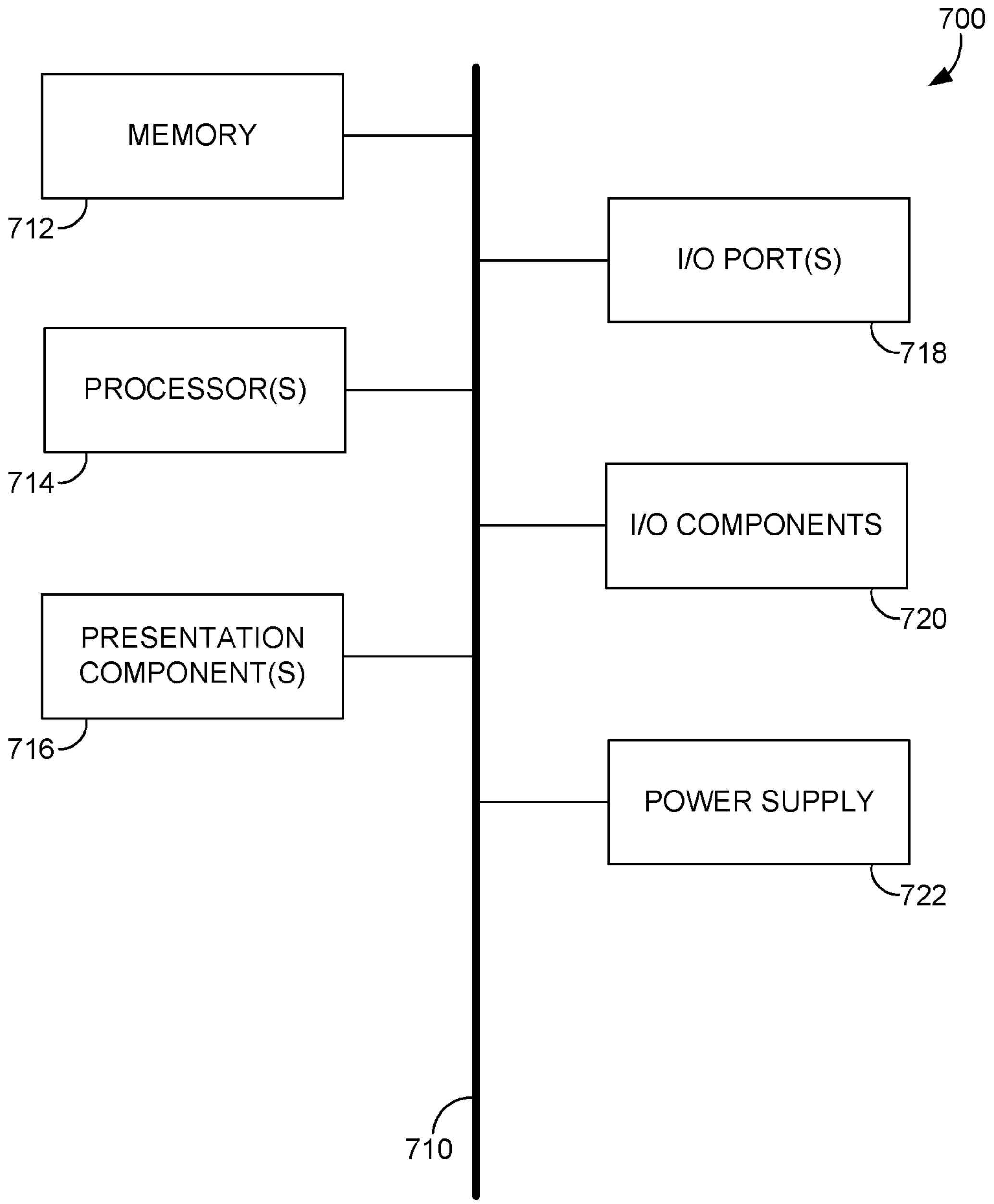
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present technical solution. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

For purposes of this disclosure the word "support" refers to provisioning of functionality, services, or assistance by a computing component or through computing operations within a broader computing system. When a computing component or set of operations supports a specific functionality, it means that it plays a role in enabling or executing that particular aspect of the computing system. This support can manifest in various ways, including the processing of data, execution of operations, management of resources, and ensuring compatibility or interoperability with other components. Additionally, support may involve providing interfaces, APIs (Application Programming Interfaces), or protocols that allow seamless interaction and integration with other elements of the computing system. The concept of support extends beyond mere functionality provision to encompass maintenance, troubleshooting, and the overall optimization of computing resources to ensure the robust and efficient operation of the computing system.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:

one or more computer processors; and computer memory storing computer-useable instructions that, when used by the one or more computer processors, cause the one or more computer processors to perform operations, the operations comprising:

communicating a request to an identity provider to create identity provider data for a remote client device of a cloud platform;

based on communicating the request, receiving a bootstrap token containing a remote client device identifier, wherein the bootstrap token is a temporary identity used to provision the remote client device without tenant information, and wherein the remote client device is subsequently assignable to one of a tenant context or a consumer context following provisioning, wherein the tenant context is associated with tenant information and the consumer context is associated with a cloud-provider-managed environment; and provisioning the remote client device, wherein provisioning the remote client device comprises:

creating a set of cloud resources for the remote client device; and installing the bootstrap token onto a virtual machine associated with the remote client device;

wherein the remote client device is configured to employ the bootstrap token to request a signed certificate from the identity provider, and the signed certificate supports access to applications and services of the cloud platform using the remote client device.

2. The system of claim 1, wherein the cloud-provider-managed environment is associated with a secure channel that supports installing the bootstrap token on the virtual machine.

3. The system of claim 1, wherein the bootstrap token is a temporary identity that is operable with the remote client device in a business context associated with a tenant or the consumer context associated with the cloud-provider-managed environment, wherein the business context indicates that the virtual machine operates with tenant information and the consumer context indicates that the virtual machine operates without tenant information in the cloud-provider-managed environment.

4. The system of claim 1, further comprising a tenantless access orchestration engine that provides tenantless access orchestration operations to allow users to use remote client devices in a consumer context, the remote client devices are not associated with tenant information.

5. The system of claim 4, wherein the tenantless access orchestration engine provides a cloud-based services engine, the remote client device, and the identity provider, the cloud-based services engine is a management service that provides business resources and logic.

6. The system of claim 1, wherein tenantless access orchestration operations support a Desktop as a Service feature (DaaS) of the cloud platform that hosts cloud resources in the cloud-provider-managed environment.

7. The system of claim 1, wherein the cloud platform supports a first set of remote client devices in a consumer context, the first set of remote client devices are associated with a cloud-provider-managed environment of the cloud platform, and a second set of remote client devices in a business context, the second set of remote client devices are associated with a tenant of an organization.

8. The system of claim 1, the operations further comprising:

communicating, from the remote client device, the request for the signed certificate from the identity provider, wherein the signed certificate is generated based on the identity provider data for the remote client device;

receiving, by the remote client device, the signed certificate associated with the identity provider data; and based on the signed certificate, accessing an application or service of the cloud platform.

9. The system of claim 1, the operations further comprising:

receiving, at the identity provider, a first request, from a cloud-based services engine, to create identity provider data for a first remote client device of a cloud platform;

communicating, from the identity provider to the first remote client device, a first bootstrap token containing a first remote client device identifier;

receiving, at the identity provider, a second request, from the first remote client, for a signed certificate; and communicating, from the identity provider, the signed certificate to the first remote client device, wherein the signed certificate supports the first remote client device's access to applications and services of the cloud platform.

10. The system of claim 1, wherein the identity provider stores identity provider data including a join status and assignment status of remote client devices.

11. One or more computer storage media having computer-executable instructions embodied thereon that, when executed by a computing system having a processor and memory, cause the processor to perform operations, the operations comprising:

communicating, from a remote client device, a request for a signed certificate from an identity provider, wherein the signed certificate is generated based on identity provider data for the remote client device, wherein the remote client device is associated with a cloud-provider-managed environment of a cloud platform, wherein the remote client device is provisioned based on installing a bootstrap token onto a virtual machine associated with the remote client device, wherein the bootstrap token is a temporary identity used to provision the remote client device without tenant information, and wherein the remote client device is subsequently assignable to one of a tenant context or a consumer context following provisioning, wherein the tenant context is associated with tenant information and the consumer context is associated with a cloud-provider-managed environment;

receiving the signed certificate associated with the identity provider data; and based on the signed certificate, accessing an application or service of the cloud platform.

12. The media of claim 11, wherein the remote client device is provisioned based on:

creating a set of cloud resources for the remote client device; and installing the bootstrap token onto the virtual machine associated with the remote client device, wherein the virtual machine is associated with the cloud-provider-managed environment.

13. The media of claim 12, wherein the remote client device is configured to employ the bootstrap token to request the signed certificate from the identity provider, the signed certificate supports the remote client device's access to applications and services of the cloud platform.

14. The media of claim 11, wherein the identity provider stores the identity provider data comprising a join status and an assignment status of the remote client device.

15. The media of claim 11, wherein the cloud platform supports a first set of remote client devices in a consumer context, the first set of remote client devices are associated with a cloud-provider-managed environment of the cloud platform, and a second set of remote client devices in a business context, the second set of remote client devices are associated with a tenant of an organization.

16. A computer-implemented method, the method comprising:

receiving a request, from a cloud-based services engine, to create identity provider data for a remote client device of a cloud platform;

communicating a bootstrap token containing a remote client device identifier, wherein the bootstrap token is a temporary identity used to provision the remote client device without tenant information, and wherein the remote client device is subsequently assignable to one of a tenant context or a consumer context following provisioning, wherein the tenant context is associated with tenant information and the consumer context is associated with a cloud-provider-managed environment;

receiving a second request, from the remote client, for a signed certificate; and communicating the signed certificate to the remote client device, wherein the signed certificate supports the remote client device's access to applications and services of the cloud platform.

17. The method of claim 16, wherein the remote client device is provisioned based on:

creating a set of cloud resources for the remote client device; and installing the bootstrap token onto a virtual machine associated with the remote client device, wherein the virtual machine is associated with a cloud-provider-managed environment.

18. The method of claim 17, wherein the remote client device is configured to employ the bootstrap token to request the signed certificate from an identity provider, the signed certificate supports the remote client device's access to applications and services of the cloud platform.

19. The method of claim 16, wherein an identity provider stores the identity provider data comprising a join status and an assignment status of the remote client device.

20. The method of claim 16, wherein the cloud platform supports a first set of remote client devices in a consumer context, the first set of remote client devices are associated with a cloud-provider-managed environment of the cloud platform, and a second set of remote client devices in a business context, the second set of remote client devices are associated with a tenant of an organization.

* * * * *